United States Patent
Asahara

(10) Patent No.: US 11,300,972 B2
(45) Date of Patent: Apr. 12, 2022

(54) PATH PLANNING DEVICE, PATH PLANNING METHOD, AND PROGRAM

(71) Applicant: TOYOTA JIDOSHA KABUSHIKI KAISHA, Toyota (JP)

(72) Inventor: Yoshiaki Asahara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 148 days.

(21) Appl. No.: 16/274,816

(22) Filed: Feb. 13, 2019

(65) Prior Publication Data

US 2019/0302792 A1    Oct. 3, 2019

(30) Foreign Application Priority Data

Mar. 30, 2018   (JP) .............................. JP2018-068273

(51) Int. Cl.
*G05D 1/02*     (2020.01)
*G06T 7/70*     (2017.01)

(52) U.S. Cl.
CPC ........... *G05D 1/0238* (2013.01); *G05D 1/024* (2013.01); *G05D 1/0217* (2013.01); *G05D 1/0251* (2013.01); *G05D 1/0274* (2013.01); *G06T 7/70* (2017.01); *G05D 2201/0214* (2013.01); *G06T 2207/30261* (2013.01)

(58) Field of Classification Search
None
See application file for complete search history.

(56) References Cited

U.S. PATENT DOCUMENTS

| | | | |
|---|---|---|---|
| 4,809,178 A | 2/1989 | Ninomiya et al. | |
| 9,588,518 B2 | 3/2017 | Nakamura et al. | |
| 10,606,269 B2* | 3/2020 | Millard ............... | G05D 1/0274 |
| 2008/0269973 A1* | 10/2008 | Kuroda ............... | G05D 1/0214 |
| | | | 701/26 |
| 2014/0309835 A1* | 10/2014 | Yamamoto ........... | G05D 1/0274 |
| | | | 701/25 |
| 2015/0336575 A1 | 11/2015 | Zeng | |
| 2018/0353042 A1* | 12/2018 | Gil ....................... | G05D 1/0088 |

(Continued)

FOREIGN PATENT DOCUMENTS

| | | |
|---|---|---|
| CN | 105182364 A | 12/2015 |
| JP | 2008-276731 A | 11/2008 |

(Continued)

*Primary Examiner* — Aniss Chad
*Assistant Examiner* — Mahmoud M Kazimi
(74) *Attorney, Agent, or Firm* — Oliff PLC

(57) ABSTRACT

A path planning device includes: data acquisition means for acquiring position data of an obstacle; storage means for storing the position data of the obstacle; and path setting means for setting, based on an environmental map, the acquired position data of the obstacle and the position data of the obstacle stored in the storage means, a moving path to a target position, and regularly updating the moving path. The path setting means sets, when the path setting means determines that the acquired obstacle is positioned on a first moving path to the target position after the first moving path is set, a second moving path in which there is no obstacle on a moving path. The storage means stores the position data of the obstacle on the first moving path when the moving load along the second moving path is larger than the moving load along the first moving path.

10 Claims, 17 Drawing Sheets

(56) References Cited

U.S. PATENT DOCUMENTS

| | | | |
|---|---|---|---|
| 2021/0096579 A1* | 4/2021 | Artes | G05D 1/0274 |
| 2021/0293548 A1* | 9/2021 | Sorensen | G05D 1/0248 |

FOREIGN PATENT DOCUMENTS

| | | | |
|---|---|---|---|
| JP | 2009-178782 A | 8/2009 | |
| JP | 2009-301401 A | 12/2009 | |
| JP | 2010-102485 A | 5/2010 | |
| JP | 2014-123200 A | 7/2014 | |
| JP | 2016-12257 A | 1/2016 | |
| JP | 2016-028311 A | 2/2016 | |
| JP | 2017-182454 A | 10/2017 | |

\* cited by examiner

| OBSTACLE CATEGORY | DETECTION PATTERN (DETECTED: ○) | |
|---|---|---|
| A | LRF: ○<br>Depth: ○ |  |
| B | LRF: ×<br>Depth: ○ |  |
| C | LRF: ×<br>Depth: ○ |  |
| D | LRF: ○<br>Depth: × |  |

PATH PLANNING DEVICE, PATH PLANNING METHOD, AND PROGRAM

CROSS REFERENCE TO RELATED APPLICATIONS

This application is based upon and claims the benefit of priority from Japanese patent application No. 2018-068273, filed on Mar. 30, 2018, the disclosure of which is incorporated herein in its entirety by reference.

BACKGROUND

The present disclosure relates to a path planning device, a path planning method, and a program for planning a moving path of a moving body.

A path planning device configured to update an environmental map based on a result of detection by detection means and plan a moving path of a moving body by referring to the environmental map has been known (see, for example, Japanese Unexamined Patent Application Publication No. 2009-178782).

SUMMARY

When, for example, a moving path that avoids a detected obstacle is set and position data of this obstacle is stored and held without being erased, a problem that the amount of storage increases occurs. On the other hand, when no position data of obstacles is stored, a moving path is set when the moving path is updated based on an assumption that the obstacle that has been detected in the past is not present. However, when the obstacle detected in the past is present on the moving path that has been set, a moving path needs to be changed again, which may cause waste of movement by the moving body.

The present disclosure has been made in view of the aforementioned problem and aims to provide a path planning device, a path planning method, and a program capable of suppressing waste of movement by the moving body while preventing the increase in the amount of the storage.

One aspect of the present disclosure in order to accomplish the aforementioned object is a path planning device including:

data acquisition means for acquiring position data of an obstacle in the vicinity of a moving body;

storage means for storing the position data of the obstacle on a moving path of the moving body acquired by the data acquisition means; and path setting means for setting, based on an environmental map of the moving body, the position data of the obstacle acquired by the data acquisition means, and the position data of the obstacle stored in the storage means, the moving path to a target position of the moving body, and regularly updating the moving path that has been set, in which the path setting means sets, when the path setting means determines that the obstacle acquired by the data acquisition means is positioned on a first moving path to the target position of the moving body after the first moving path is set, a second moving path in which there is no obstacle on the moving path to the target position, and the storage means stores the position data of the obstacle on the first moving path acquired by the data acquisition means when the load in accordance with the movement along the second moving path is larger than the load in accordance with the movement along the first moving path.

In this aspect, classification means for classifying the obstacle acquired by the data acquisition means into one of a plurality of predetermined types may be further provided, in which the storage means may store, when the load in accordance with the movement along the second moving path is larger than the load in accordance with the movement along the first moving path, the position data of the obstacle on the first moving path acquired by the data acquisition means based on the type of the obstacle classified by the classification means.

In this aspect, the classification means may classify the obstacle acquired by the data acquisition means as a dynamic obstacle that moves and a static obstacle that does not move, and the storage means may store position data of the static obstacle classified by the classification means and may not store position data of the dynamic obstacle classified by the classification means.

In this aspect, classification means for classifying the obstacle acquired by the data acquisition means into one of a plurality of predetermined types may be further provided, in which the path setting means may erase, when the path setting means determines that it cannot set the second moving path based on the position data of the obstacle stored in the storage means, the position data of the obstacle in the storage means based on the type of the obstacle classified by the classification means and set the moving path.

In this aspect, the classification means may classify the obstacle acquired by the data acquisition means as a dynamic obstacle that moves or a static obstacle that does not move, the priority order of the dynamic obstacle when the position data of the obstacle is erased may be set to be higher than the priority order of the static obstacle, and the path setting means may erase, when the path setting means determines that it cannot set the second moving path, the position data of the obstacles in the storage means one by one in accordance with the priority order of the type of the obstacle classified by the classification means and set the moving path.

In this aspect, the classification means may classify the obstacle acquired by the data acquisition means as the dynamic obstacle, the static obstacle, or an unknown obstacle that can be classified as neither the dynamic obstacles nor the static obstacles, the priority order of the dynamic obstacle, the priority order of the unknown obstacle, and the priority order of the static obstacle may be set to be high in this order, and the path setting means may erase, when the path setting means determines that it cannot set the second moving path, the position data of the obstacles one by one from the obstacle whose priority order is the highest, thereby setting the moving path.

In this aspect, the data acquisition means may include a plurality of different sensors configured to acquire the position data of the obstacle in the vicinity of the moving body, and the classification means may determine whether each of the sensors is able to detect the obstacle, thereby classifying the obstacle acquired by the data acquisition means into one of a plurality of predetermined types.

One aspect of the present disclosure in order to achieve the aforementioned object may be a path planning method including:

acquiring position data of an obstacle in the vicinity of a moving body;

storing the position data of the obstacle on a moving path of the moving body that has been acquired;

setting, based on an environmental map of the moving body, the position data of the moving body that has been acquired, and the position data of the obstacle that has been stored, the moving path to a target position of the moving body, and regularly updating the moving path that has been set, in which when it is determined that the obstacle that has been acquired is positioned on a first moving path to the target position of the moving body after the first moving path is set, a second moving path in which there is no obstacle on the path to the target position is set; and when the load in accordance with the movement along the second moving path is larger than the load in accordance with the movement along the first moving path, the position data of the obstacle on the first moving path that has been acquired is stored.

One aspect of the present disclosure in order to achieve the aforementioned object may be a program for causing a computer to execute the following processing of:

acquiring position data of an obstacle in the vicinity of a moving body;

storing the position data of the obstacle on a moving path of the moving body that has been acquired;

setting, based on an environmental map of the moving body, the position data of the obstacle that has been acquired, and the position data of the obstacle that has been stored, the moving path to a target position of the moving body, and regularly updating the moving path that has been set;

setting, when it is determined that the obstacle that has been acquired is positioned on a first moving path to the target position of the moving body after the first moving path is set, a second moving path in which there is no obstacle on the path to the target position; and storing the position data of the obstacle on the first moving path that has been acquired when the load in accordance with the movement along the second moving path is larger than the load in accordance with the movement along the first moving path.

According to the present disclosure, it is possible to provide a path planning device, a path planning method, and a program capable of suppressing waste of movement by the moving body while preventing the increase in the amount of the storage.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Hereinafter, with reference to the drawings, embodiments of the present disclosure will be explained. However, the present disclosure is not limited to the following embodiments. In order to clarify the explanation, the following description and the drawings are simplified as appropriate.

Figure 1:
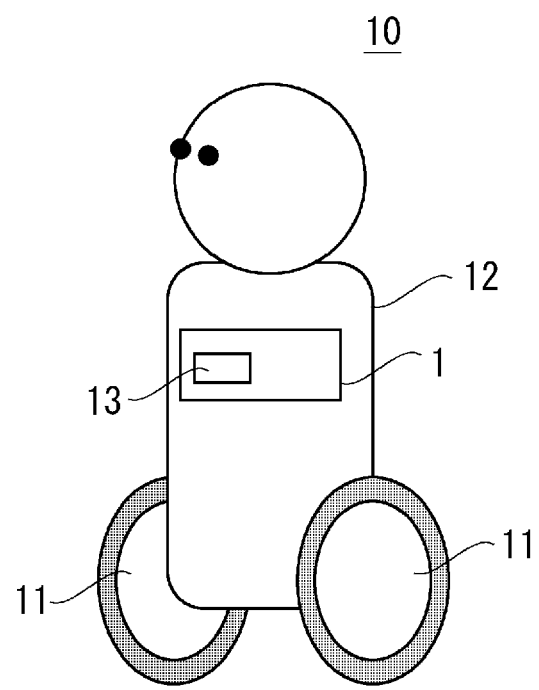
FIG. 1 is an external view schematically showing a configuration of a robot.

Referring first to FIG. 1, a configuration of a robot, which is one example of a moving body according to the present disclosure, will be explained. FIG. 1 is an external view schematically showing a configuration of a robot 10. In the first embodiment, the robot 10 is described as a moving robot that autonomously moves. The robot 10 includes wheels 11, a housing 12, and a sensor unit 13. A motor for driving the wheels 11, a battery for driving the motor and the like are provided inside the housing 12. The robot 10 moves by driving the motor and rotating the wheels 11. The robot 10 moves, for example, at a speed about the same as a walking speed of a human being. The sensor unit 13 is provided in the housing 12. The sensor unit 13 is one specific example of data acquisition means.

The robot 10 is provided with a path planning device 1 according to the first embodiment of the present disclosure. The path planning device 1 is composed as a processing unit including a Central Processing Unit (CPU), a memory such as a Read Only Memory (ROM) or a Random Access Memory (RAM), an interface for communication (I/F) and the like. The path planning device 1 may include a removable HDD, an optical disk, a magneto-optical disk and the like. The path planning device 1 is not limited to a physically one configuration.

The path planning device 1 plans a moving path along which the robot 10 moves. The robot 10 controls the motor in such a way that it moves along the moving path that has been planned. As a matter of course, the robot 10 is not limited to a wheel-type moving robot and may be a walking-type moving body or a moving body of another type. The robot 10 may be a moving body that performs self-position estimation and moves.

Figure 2:
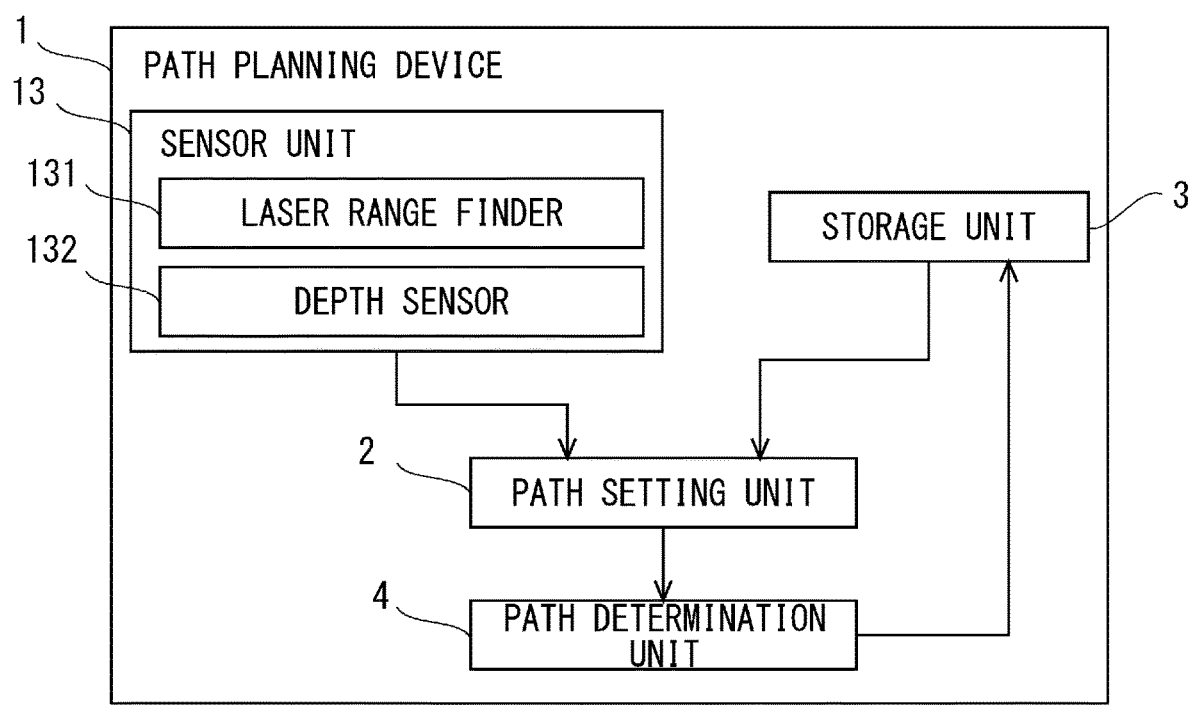
FIG. 2 is a block diagram showing a schematic system configuration of a path planning device according to a first embodiment of the present disclosure.

FIG. 2 is a block diagram showing a schematic system configuration of the path planning device according to the first embodiment. The path planning device 1 according to the first embodiment includes the sensor unit 13, a path setting unit 2 configured to set the moving path to the target position, a storage unit 3 configured to store an environmental map and the like, and a path determination unit 4 configured to determine an alternative path.

The sensor unit 13 includes a laser range finder 131 and a depth sensor 132. The laser range finder 131 is provided, for example, in the housing 12. The laser range finder 131 irradiates an obstacle or the like with laser beams, thereby acquiring position data of the obstacle in the vicinity of the robot 10. The depth sensor 132 is provided, for example, in the housing 12. The depth sensor 132 includes, for example, a pair of cameras, and performs matching between images captured by the respective cameras, thereby acquiring the position data of the obstacle in the vicinity of the robot 10.

The path setting unit 2 is one specific example of path setting means. The path setting unit 2 sets the moving path from the current position of the robot 10 to the target position based on the environmental map of the robot 10. The path setting unit 2 sets, for example, the shortest moving path from the current position of the robot 10 to the target position. The path setting unit 2 updates, for example, the moving path that has been set at every predetermined period. When the path setting unit 2 determines that there is an obstacle on the moving path that it has set based on the position data of the obstacle acquired by the sensor unit 13, the path setting unit 2 sets an alternative path that bypasses this obstacle as a new moving path.

The environmental map, which is a map describing an environment where the robot 10 moves (location of a static obstacle etc.), is stored in the storage unit 3 in advance.

Incidentally, when, for example, a moving path that avoids an obstacle that has been detected is set and position data of this obstacle is stored and held without being erased, a problem that the amount of storage increases occurs. On the other hand, when no position data of obstacles is stored, a moving path is set when the moving path is updated based on an assumption that the obstacle that has been detected in the past is not present. When the obstacle detected in the past is present on the moving path that has been set, a moving path needs to be changed again, which may cause waste of movement by the robot.

On the other hand, in the first embodiment, when it is determined that the obstacle acquired by the sensor unit 13 is positioned on a first moving path to the target position of the robot 10 after the path setting unit 2 has set the first moving path, the path setting unit 2 sets a second moving path in which there is no obstacle on the path to the target position. When the load in accordance with the movement along the second moving path is larger than the load in accordance with the movement along the first moving path, the storage unit 3 stores the position data of the obstacle on the first moving path acquired by the sensor unit 13.

When the load in accordance with the movement along the second moving path is larger than the load in accordance with the movement along the first moving path, if the position data of the obstacle on the first moving path is not stored, it is possible that the first moving path with a low moving load may be re-set when the moving path is regularly updated. In the aforementioned first embodiment, when the load in accordance with the movement along the second moving path is larger than the load in accordance with the movement along the first moving path, the storage unit 3 stores the position data of the obstacle on the first moving path acquired by the sensor unit 13. Owing to the position data of the obstacle on the first moving path, it is possible to reduce the probability that the first moving path is set as the moving path again. That is, the phenomenon that the obstacle detected in the past is present on the moving path that has been set and thus the moving path needs to be changed again can be prevented, and thus the waste of movement by the robot 10 can be prevented.

On the other hand, when the load in accordance with the movement along the second moving path is smaller than the load in accordance with the movement along the first moving path, the probability that the first moving path who se moving load is larger than that of the second moving path is re-set when the moving path is regularly updated is low. Therefore, even when the position data of the obstacle on the first moving path acquired by the sensor unit 13 is not stored, the probability that waste of movement by the robot 10 occurs is low. Therefore, when the load in accordance with the movement along the second moving path is not larger than the load in accordance with the movement along the first moving path, the storage unit 3 does not store the position data of the obstacle on the first moving path acquired by the sensor unit 13. Accordingly, the increase in the amount of the storage can be prevented. That is, according to the first embodiment, it is possible to reduce waste of movement by the robot 10 while preventing the amount of storage from increasing.

Now, a method of determining the moving load in the moving path described above will be explained in detail.

The path determination unit 4 determines whether the moving path that has been set by the path setting unit 2 is an alternative path with a high moving load. The alternative path indicates, for example, a moving path with a higher moving load (longer moving distance) that has been newly set this time in order to avoid the obstacle on the moving path set last time.

The path determination unit 4 determines whether the moving path set this time is an alternative path by comparing an area S of the region surrounded by the moving path set last time and the moving path set this time, and a threshold.

Figure 3:
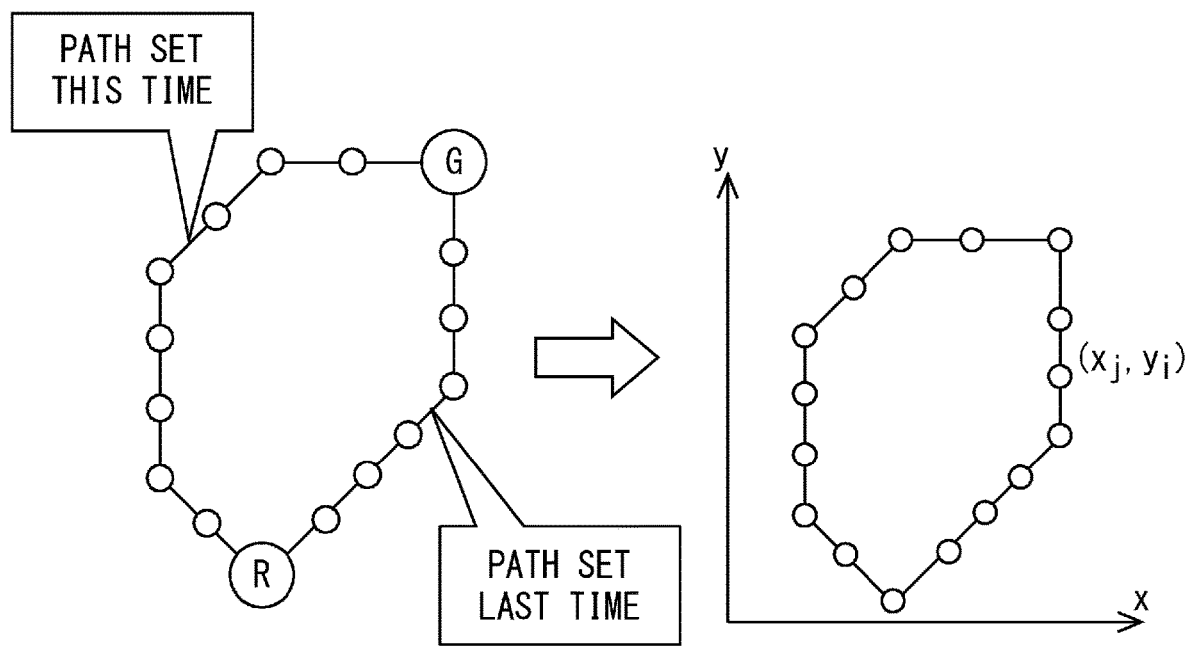
FIG. 3 is a diagram showing an area of a moving path set last time and a moving path set this time.

As shown in FIG. 3, the path determination unit 4 approximates, for example, the moving path set last time and the moving path set this time by a plurality of straight lines. The path determination unit 4 calculates, using the surrounded region as a polygon having L vertices, the area S of this region.

In this case, when the number of path points in the moving path set last time is denoted by M and the number of path points in the moving path set this time is denoted by N, the number of vertices L can be obtained by the following expression. In the following expression, since the start point and the end point are counted twice in a duplicated way, 2 is subtracted.

$L=M+N-2$

Figure 4:
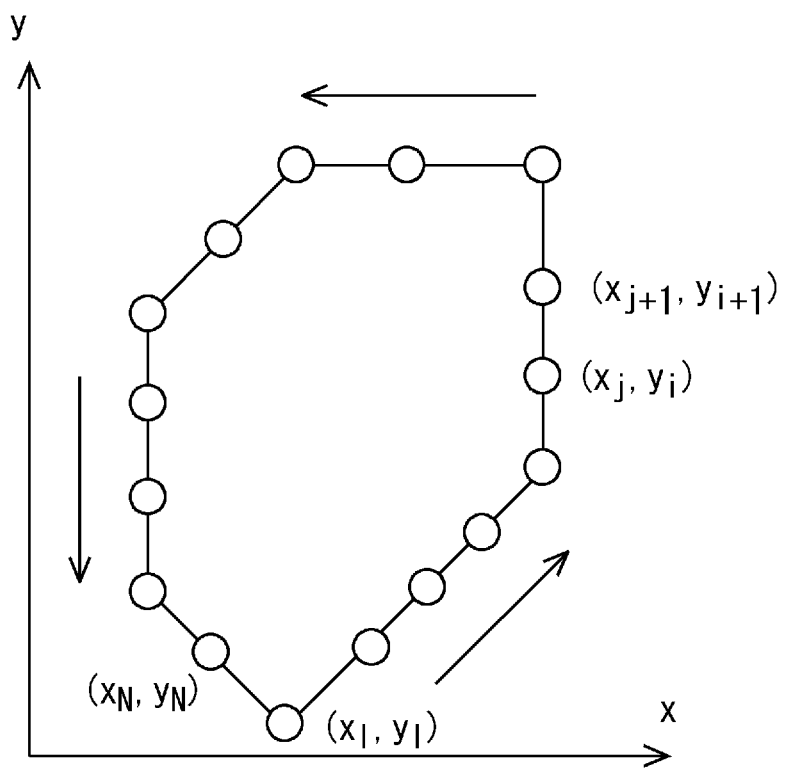
FIG. 4 is a diagram that expresses indices of respective vertices.

When the indices of the respective vertices are expressed as shown in FIG. 4, the area S of the region can be calculated by the following expression.

$$S = \frac{1}{2}\left|\sum_{i=1}^{n}(x_i y_{i+1} - x_{i+1} y_i)\right|$$

When it is determined that the area S of the region calculated using the aforementioned expression is equal to or larger than the threshold, the path determination unit 4 determines that the moving path set this time is an alternative path. The optimal value of the threshold is calculated, for example, based on the size of the robot 10 (an area projected from an upper side), and is set in the storage unit 3 in advance. The threshold may be set in view of the operability of the robot 10 in the real environment.

When it is determined that the obstacle acquired by the sensor unit 13 is positioned on the first moving path after the first moving path to the target position of the robot 10 is set, the path setting unit 2 sets the second moving path in which there is no obstacle on the path to the target position.

As described above, the path determination unit 4 determines whether the second moving path set by the path setting unit 2 is an alternative path. When the path determination unit 4 determines that the second moving path set by the path setting unit 2 is an alternative path, the path determination unit 4 transmits the position data of the obstacle on the first moving path acquired by the sensor unit 13 to the storage unit 3. The storage unit 3 stores the position data of the obstacle from the path determination unit 4.

Figure 5:
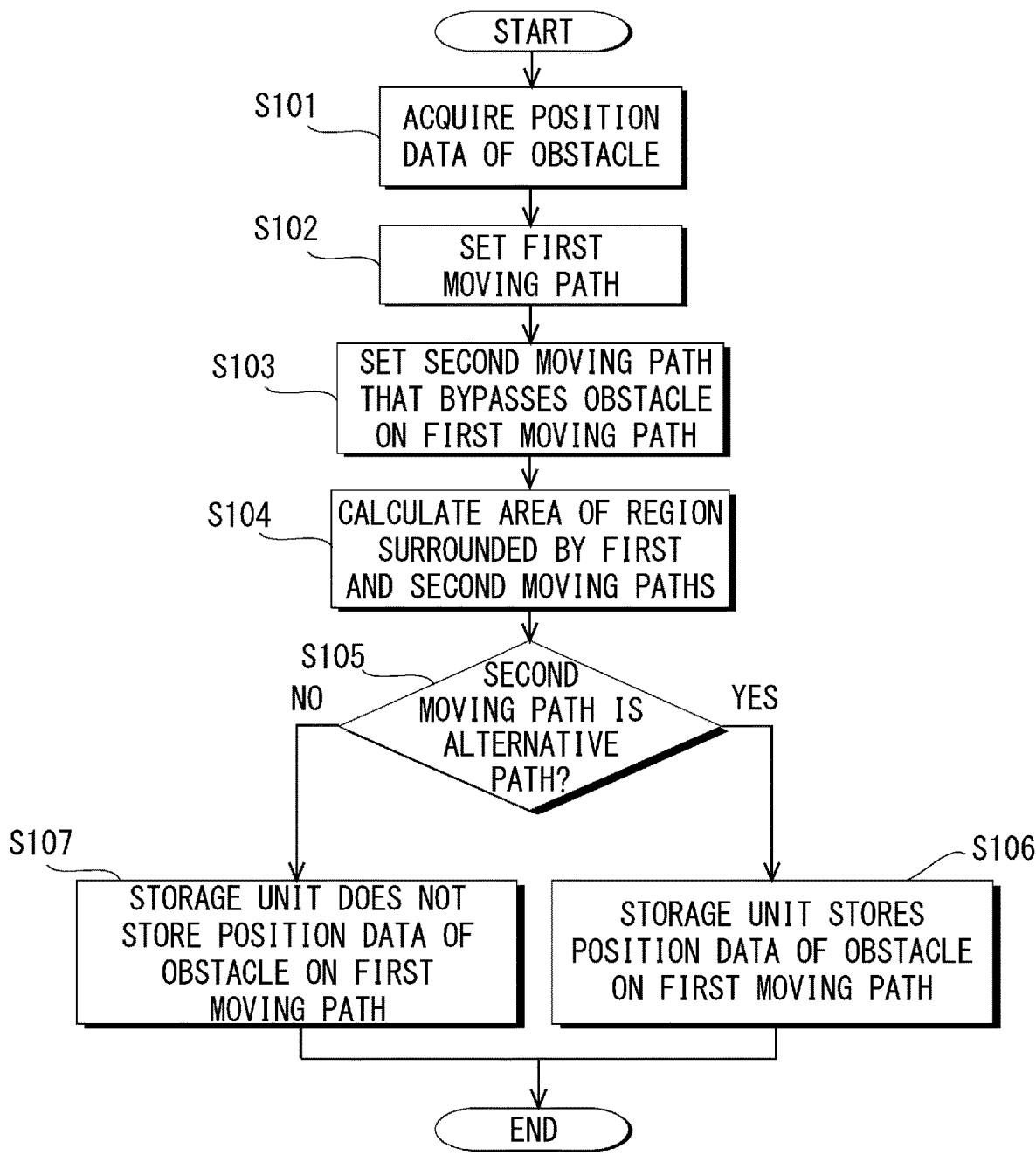
FIG. 5 is a flowchart showing a process flow of the path planning device according to the first embodiment of the present disclosure.

FIG. 5 is a flowchart showing a process flow of the path planning device according to the first embodiment. The processing shown in FIG. 5 is repeatedly executed at predetermined time intervals. The sensor unit 13 acquires the position data of the obstacle in the vicinity of the robot 10, and outputs the position data of the obstacle that has been acquired to the path setting unit 2 (Step S101).

The path setting unit 2 sets the first moving path based on the position data of the obstacle from the sensor unit 13, and the environmental map and the position data of the obstacle stored in the storage unit 3 (Step S102).

When the path setting unit 2 determines that there is an obstacle on the first moving path based on the position data of the obstacle from the sensor unit 13, the path setting unit 2 sets the second moving path that bypasses this obstacle (Step S103).

The path determination unit 4 calculates the area S of the region surrounded by the first moving path and the second moving path that have been set (Step S104). The path determination unit 4 determines whether the area S of the region that has been calculated is equal to or larger than the threshold of the storage unit 3, thereby determining whether the second moving path that has been set is an alternative path (Step S105).

When the path determination unit 4 determines that the second moving path that has been set is the alternative path (YES in Step S105), the storage unit 3 stores the position data of the obstacle on the first moving path (Step S106). On the other hand, when the path determination unit 4 determines that the second moving path that has been set is not the alternative path (NO in Step S105), the storage unit 3 does not store the position data of the obstacle on the first moving path (Step S107).

As discussed above, in the first embodiment, when it is determined that the obstacle acquired by the sensor unit 13 is positioned on the first moving path after the first moving path to the target position of the robot 10 is set, the second moving path in which there is no obstacle on the path to the target position is set. When the load in accordance with the movement along the second moving path is larger than the load in accordance with the movement along the first moving path, the storage unit 3 stores the position data of the obstacle on the first moving path acquired by the sensor unit 13.

Accordingly, owing to the position data of the obstacle on the first moving path stored in the storage unit 3, the probability that the first moving path is set as the moving path again can be reduced. Therefore, it is possible to prevent the phenomenon that the obstacle detected in the past is present on the moving path that has been set and thus the moving path needs to be changed again, and to thus prevent the waste of movement by the robot 10. Further, when the load in accordance with the movement along the second moving path is not larger than the load in accordance with the movement along the first moving path, the storage unit 3 does not store the position data of the obstacle on the first moving path acquired by the sensor unit 13. Accordingly, the increase in the amount of the storage can be prevented. That is, according to the first embodiment, it is possible to reduce waste of movement by the robot 10 while preventing the amount of storage from increasing.

Second Embodiment

Figure 6:
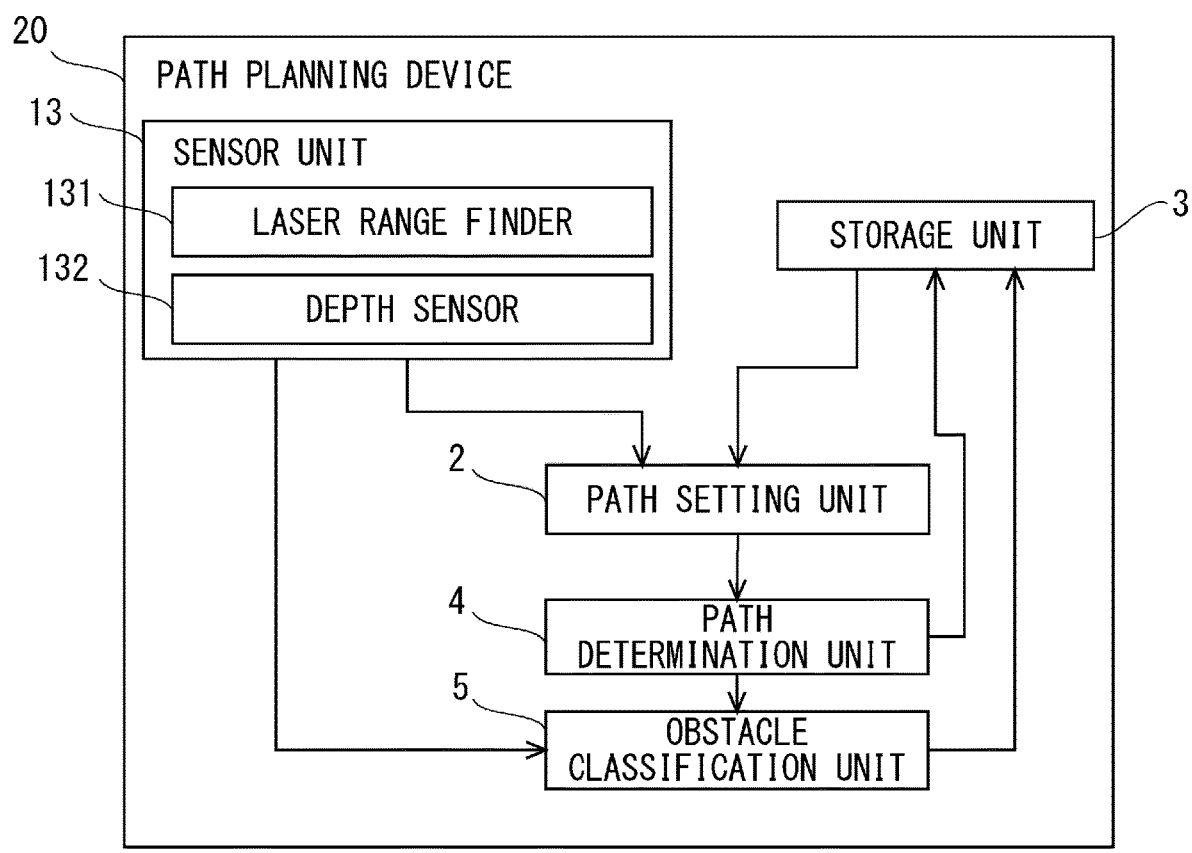
FIG. 6 is a block diagram showing a schematic system configuration of a path planning device according to a second embodiment of the present disclosure.

FIG. 6 is a block diagram showing a schematic system configuration of a path planning device according to a second embodiment of the present disclosure. A path planning device 20 according to the second embodiment further includes an obstacle classification unit 5 for classifying obstacles acquired by the sensor unit 13 into a plurality of predetermined types. The obstacle classification unit 5 is one specific example of classification means. The obstacle classification unit 5 classifies the obstacles as, for example, dynamic obstacles that tend to move such as a person, an animal, and a door, the dynamic obstacles being highly likely to move from a position after a predetermined period of time, and static obstacles that do not tend to move such as a desk, a chair, a home appliance, and a shelf, the static obstacles being less likely to move from the position after a predetermined period of time.

When the path determination unit 4 determines that the second moving path that has been set is the alternative path, the storage unit 3 stores the position data of the obstacle on the first moving path based on the type of the obstacle classified by the obstacle classification unit 5.

When the obstacle classification unit 5 classifies, for example, the obstacle on the first moving path as the dynamic obstacle, the storage unit 3 does not store the position data of this dynamic obstacle. It is possible that the first moving path may be re-set when the moving path is updated. However, in this case as well, since it is highly likely that the dynamic obstacle that has been present in the past is currently absent on the first moving path, the robot 10 can move along this first moving path.

As described above, by classifying the types of obstacles in detail and storing only the necessary position data, the increase in the amount of the storage can be further prevented. In the second embodiment, the components the same as those in the aforementioned first embodiment are denoted by the same reference symbols and detailed descriptions thereof are omitted.

Third Embodiment

In a third embodiment according to the present disclosure, the obstacle classification unit 5 classifies the obstacles acquired by the sensor unit 13 into a plurality of predetermined types. The path setting unit 2 sets a moving path to the target position based on the environmental map and the position data of the obstacle stored in the storage unit 3, and the position data of the obstacle acquired by the sensor unit 13.

When the path setting unit 2 determines that it cannot set a moving path based on the position data of the obstacle stored in the storage unit 3, the path setting unit 2 erases the position data of the obstacle in the storage unit 3 based on the type of the obstacle classified by the obstacle classification unit 5 and re-sets the moving path. Accordingly, it is possible to erase the position data in accordance with the type of the obstacle and efficiently set the moving path.

The obstacle classification unit 5 classifies the obstacles acquired by the sensor unit 13 as dynamic obstacles and static obstacles. Then the priority order of the dynamic obstacles when the position data of the aforementioned obstacles is erased is set higher than the priority order of the static obstacles. Accordingly, when the moving path is re-set, the dynamic obstacles that are highly likely to move are preferentially erased over the static obstacles that are less likely to move, whereby it is possible to set the moving path along which the robot can move with a high probability. Therefore, the moving path can be efficiently re-set.

Next, a method of classifying the obstacles will be explained in detail.

The obstacle classification unit 5 classifies, for example, the obstacle acquired by the sensor unit 13 into one of categories A-D.

The laser range finder (LRF) 131 and the depth sensor (Depth) 132 of the sensor unit 13 acquire point group data of the obstacle as position data of the obstacle, and outputs the point group data that has been acquired to the obstacle classification unit 5. The obstacle classification unit 5 may perform clustering on the point group data from the sensor unit 13.

The obstacle classification unit 5 classifies the obstacle into one of the categories A-D based on the overlapping manner of the point group data in the laser range finder 131 and the depth sensor 132 of the sensor unit 13.

Figure 7:
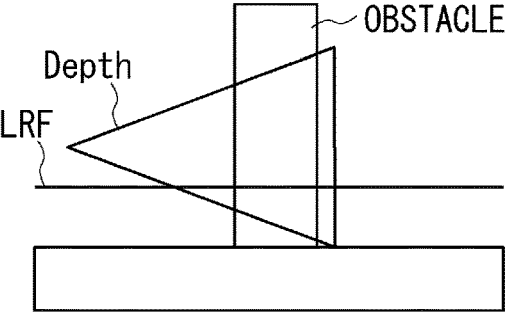
FIG. 7 is a diagram showing one example of categories of obstacles classified by an obstacle classification unit.
Figure 7:
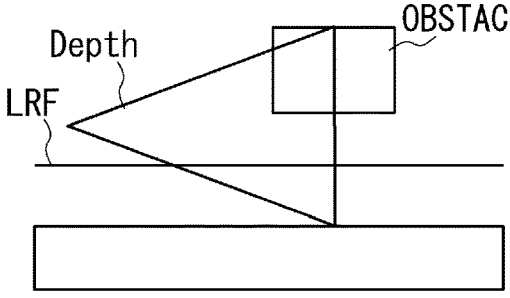
Figure 7:
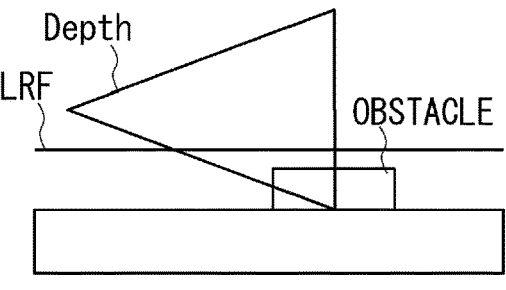
Figure 7:
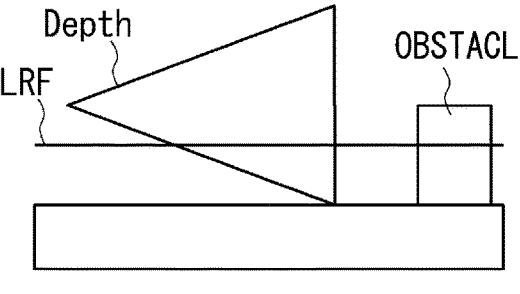

FIG. 7 is a diagram showing one example of the categories of the obstacles classified by the obstacle classification unit 5. When it is determined that both the laser range finder 131 and the depth sensor 132 are detecting an obstacle based on the point group data from the sensor unit 13, the obstacle classification unit 5 classifies this obstacle into the category A. The obstacles classified into the category A are, for example, dynamic obstacles such as a person or a door. The obstacle classified into the category A first is expressed as $A_1$, and the obstacle classified into the category A in the n-th place is expressed as $A_n$. The other categories B-D are also expressed in a similar way.

When it is determined that only the depth sensor 132 detects an obstacle and the point group data therein is present on an upper side based on the point group data from the sensor unit 13, the obstacle classification unit 5 classifies this obstacle into the category B. The obstacles classified into the category B are, for example, static obstacles such as a desk and a chair.

When it is determined that only the depth sensor 132 detects the obstacle and the point group data therein is present on a lower side based on the point group data from the sensor unit 13, the obstacle classification unit 5 classifies this obstacle into the category C. The obstacles classified into the category C are, for example, static obstacles such as low furniture or a home appliance that is placed on the ground.

When it is determined that only the laser range finder 131 detects an obstacle based on the point group data from the sensor unit 13, the obstacle classification unit 5 classifies this obstacle into the category D. The obstacles classified into the category D are, for example, an object that is present on a far side, and are unknown obstacles that can be classified as neither the dynamic obstacles nor the static obstacles.

As described above, the obstacle classification unit 5 classifies each of the obstacles acquired by the sensor unit 13 into one of the categories by determining whether each sensor is able to detect the obstacle. Accordingly, it is possible to easily classify the obstacles in view of the characteristics of the obstacles.

In the categories A-D of the obstacles, conditions when the position data of the obstacle in the storage unit 3 (hereinafter these conditions are referred to as erasure conditions) is erased when the path setting unit 2 determines that it cannot set the moving path based on the obstacles stored in the storage unit 3 are set.

The priority order when the position data of the obstacle in the storage unit 3 is erased is set as the erasure conditions. The priority order of the dynamic obstacles is set to be the highest, following the priority order of the unknown obstacles, and the priority order of the static obstacles. The reason why the priority orders are thus set is that, as described above, when the moving path is re-set, the priority order of the dynamic obstacles that are highly likely to move is preferably set to be higher than the priority order of the static obstacles that are less likely to move.

Further, it can be estimated that the unknown obstacles are less likely to move than the dynamic obstacles are but are more likely to move than the static obstacles are. Therefore, the priority order of the unknown obstacles is set between the priority order of the dynamic obstacles and the priority order of the static obstacles. By setting the priority orders of the dynamic obstacles, the unknown obstacles, and the static obstacles in this way and erasing the position data of the obstacles one by one in accordance with the priority order and setting the moving path, it is possible to set the moving path along which the robot can move easily and efficiently.

Next, the erasure conditions in the categories A-D will be explained in detail.

The following erasure conditions are set in the category A. The path setting unit 2 re-sets the moving path while erasing one by one the position data of the obstacles in the category A stored in the storage unit 3. The priority order of the unknown obstacles in the category D is lower than the priority order of the dynamic obstacles in the category A. Therefore, the path setting unit 2 erases the position data of the dynamic obstacles in the category A at a timing earlier than the timing when the position data of the unknown obstacles in the category D is erased.

When there are a plurality of pieces of position data of the obstacles in the category A stored in the storage unit 3, the path setting unit 2 selects, from among position data of the plurality of obstacles in the category A, the position data one by one randomly or in accordance with a predetermined rule, and re-sets the moving path while erasing the position data of the obstacles that has been selected. According to the predetermined rule, for example, a person or an animal may be selected before an object other than a person or an animal is selected.

Further, the obstacle classification unit 5 may set the priority order for the plurality of dynamic obstacles that have been classified in the category A. When, for example, the dynamic obstacles in the category A include a plurality of persons, the obstacle classification unit 5 may perform, based on the images of the respective persons acquired by the camera, pattern matching or the like and estimate the character information of the persons (ages, physical characteristics, and sexes). The obstacle classification unit 5 sets, based on the character information of the person that has been estimated, the priority order for this person. For example, a child tends to move more than an elderly person does. Therefore, the obstacle classification unit 5 sets the priority order of the child to be higher than the priority order of the elderly person.

The following erasure conditions are set in the categories B and C. The priority order of the static obstacles in the categories B and C is the lowest. Therefore, the path setting unit 2 re-sets the moving path without erasing the position data of the static obstacles in the categories B and C stored in the storage unit 3.

When the moving path cannot be re-set even after the position data of the dynamic obstacles in the category A and the position data of the unknown obstacles in the category D stored in the storage unit 3 are erased, the path setting unit 2 may erase the position data of the static obstacles in the categories B and C and re-set the moving path.

In this case, the obstacle classification unit 5 may set the priority order for the static obstacles in the plurality of categories C and D that have been classified. The obstacle classification unit 5 sets the priority order of the static obstacles that are less likely to move to be lower.

The following erasure conditions are set in the category D. The path setting unit 2 re-sets the moving path while erasing one by one the position data of the obstacles in the category D stored in the storage unit 3. The priority order of the unknown obstacles in the category D is lower than the priority order of the dynamic obstacles in the category A. Therefore, the path setting unit 2 erases the position data of the unknown obstacles in the category D at a timing later than the timing when the position data of the dynamic obstacles in the category A is erased.

The erasure conditions set in the categories A-D of the obstacles stated above are set, for example, in the storage unit 3 in advance. When the path setting unit 2 determines that it cannot set a moving path based on the position data of the obstacle stored in the storage unit 3, the path setting unit 2 erases the position data of the obstacle in the storage unit 3 and re-sets the moving path based on the erasure conditions of the storage unit 3.

Figure 8:
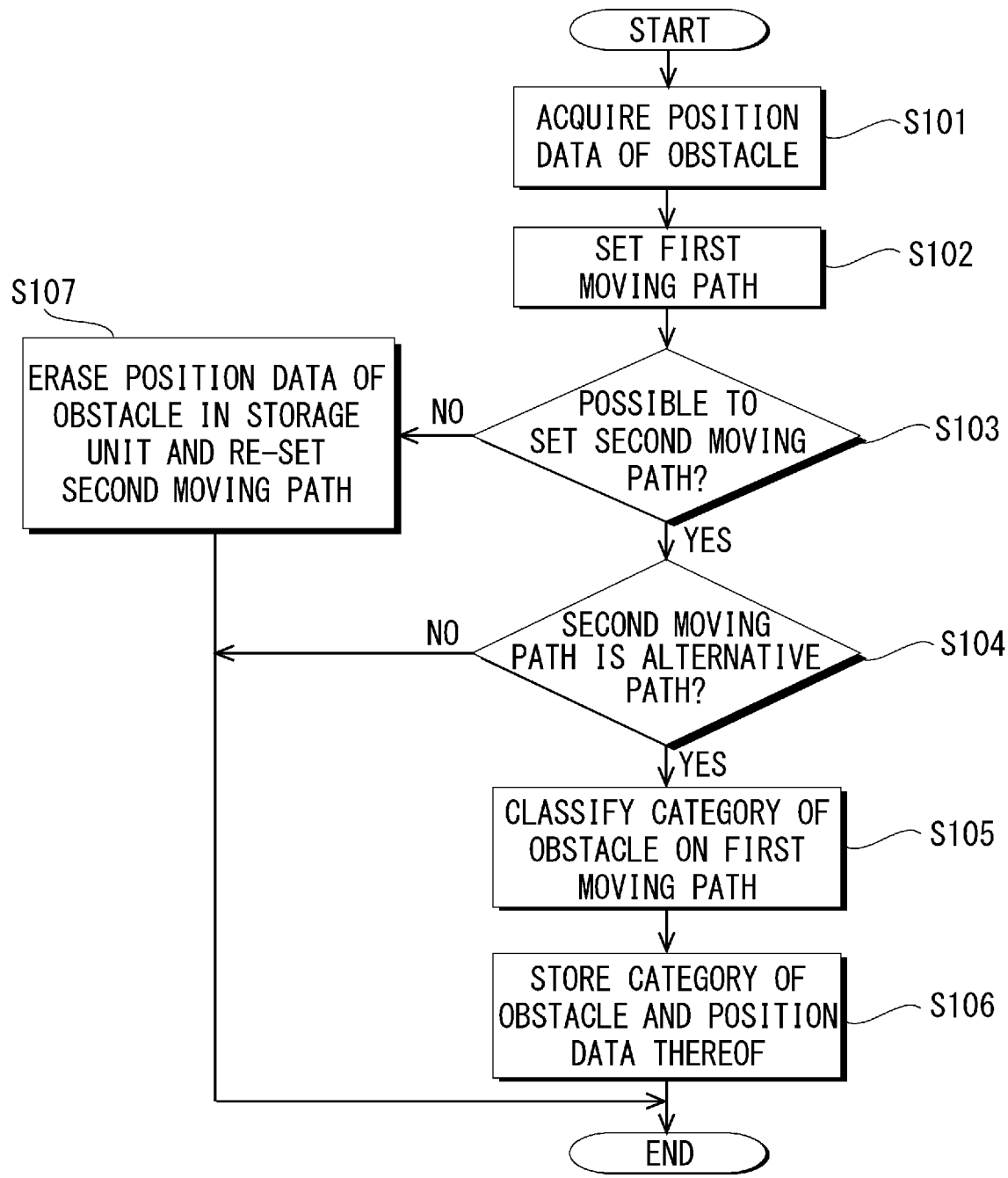
FIG. 8 is a flowchart showing a process flow of a path planning device according to a third embodiment of the present disclosure.

FIG. 8 is a flowchart showing a process flow of the path planning device according to the third embodiment. The processing shown in FIG. 8 is, for example, repeatedly executed at predetermined time intervals until the robot 10 reaches the target position.

The sensor unit 13 acquires position data of the obstacle in the vicinity of the robot 10, and outputs the position data of the obstacle that has been acquired to the path setting unit 2 (Step S101). The path setting unit 2 sets the first moving path based on the position data of the obstacle from the sensor unit 13, and the environmental map and the position data of the obstacle stored in the storage unit 3 (Step S102).

When the path setting unit 2 determines that there is an obstacle on the first moving path based on the position data of the obstacle from the sensor unit 13, the path setting unit 2 determines whether it is able to set the second moving path that bypasses this obstacle (Step S103).

When the path setting unit 2 determines that the second moving path can be set (YES in Step S103), the path setting unit 2 determines whether the area S of the region surrounded by the first moving path and the second moving path is equal to or larger than the threshold, thereby determining whether the second moving path is an alternative path (Step S104).

When the path determination unit 4 determines that the second moving path is an alternative path (YES in Step S104), the obstacle classification unit 5 classifies the obstacle on the first moving path into one of the categories $A_n$-$D_n$ (Step S105). On the other hand, when the path determination unit 4 determines that the second moving path is not an alternative path (NO in Step S104), the processing is ended.

The storage unit 3 stores the category $A_n$-$D_n$ of the obstacle that has been classified in association with the position data of the obstacle (Step S106), and this processing is ended.

When the path setting means 2 determines that it cannot set the second moving path (NO in Step S103), the path setting unit 2 erases, based on the erasure conditions of the storage unit 3, the position data of the obstacle in the storage unit 3, and re-sets the second moving path (Step S107).

Figure 9:
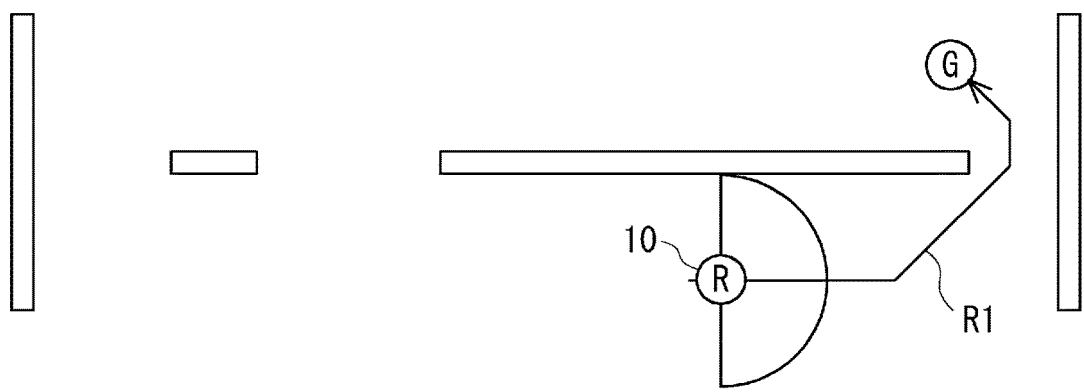
FIG. 9 is a diagram showing the shortest moving path to a target position.

Referring next to FIGS. 9 to 25, a path setting process flow of the path planning device will be explained in more detail. As shown in FIG. 9, the path setting unit 2 sets a shortest moving path R1 to a target position G based on the position data of the obstacle acquired by the sensor unit 13, and the environmental map and the position data of the obstacle stored in the storage unit 3. The robot 10 moves along the moving path R1 set by the path setting unit 2.

Figure 10:
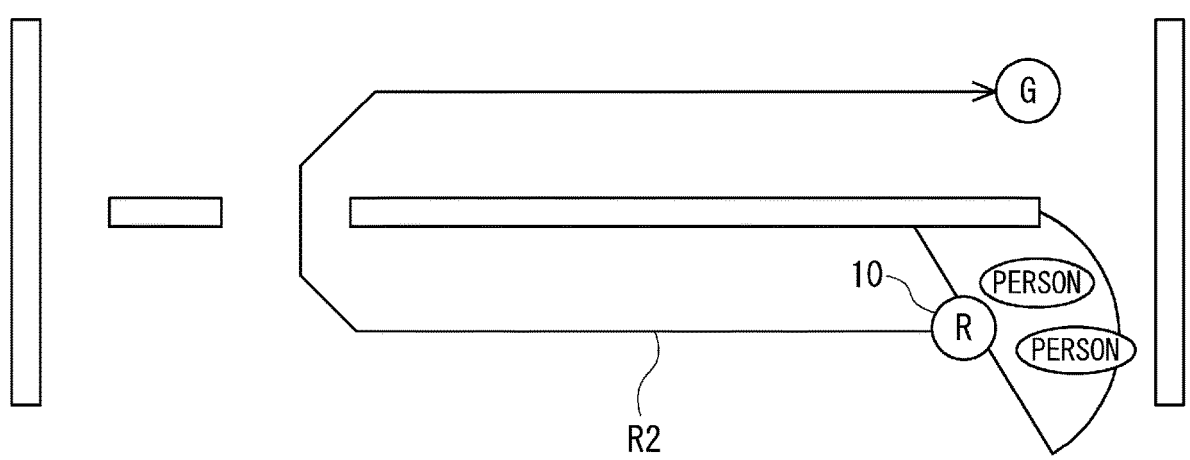
FIG. 10 is a diagram showing a moving path in which there is no obstacle on the path to the target position.

When a person appears in the vicinity of the robot 10, as shown in FIG. 10, the path setting unit 2 sets a moving path R2 in which there is no obstacle on the path to the target position G based on the position data of the person acquired by the sensor unit 13. In this case, the path setting unit 2 sets the moving path R2 that passes the central passage.

Figure 11:
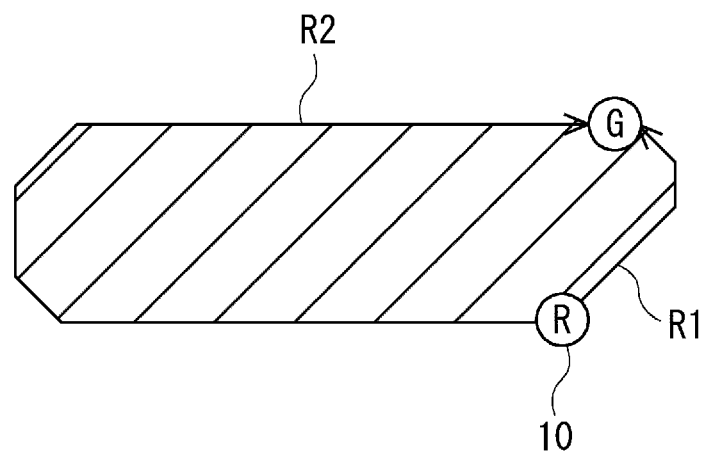
FIG. 11 is a diagram showing a region surrounded by moving paths.
Figure 12:
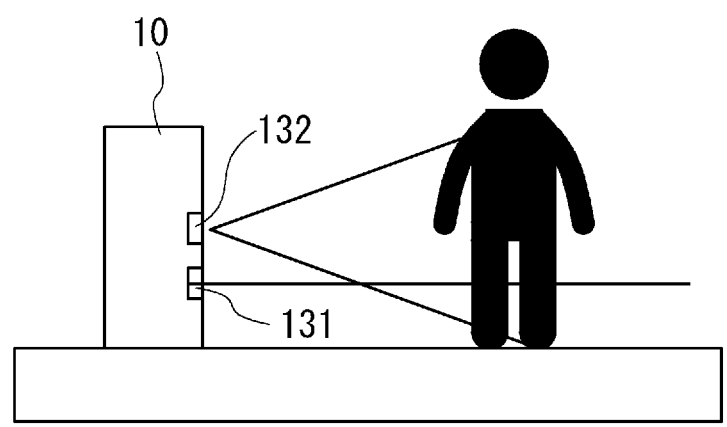
FIG. 12 is a diagram showing that both a laser range finder and a depth sensor have detected a person.

As shown in FIG. 11, the path setting unit 2 determines that the area S (shaded part) of the region surrounded by the moving paths R1 and R2 is equal to or larger than a threshold, and determines that the moving path R2 is an alternative path. As shown in FIG. 12, the obstacle classification unit 5 determines, based on the point group data from the sensor unit 13, that both the laser range finder 131 and the depth sensor 132 detect a person, and classifies this person into the category A.

Figure 13:
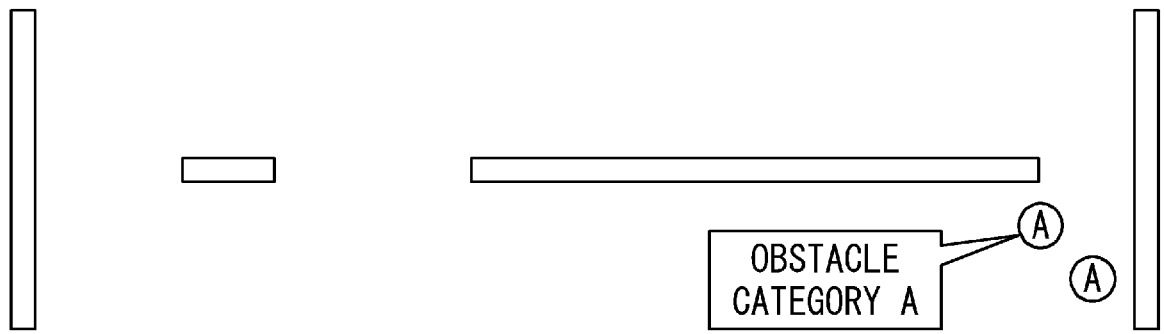
FIG. 13 is a diagram showing that a category of a person that has been classified and position data of this person are stored in association with each other.
Figure 14:
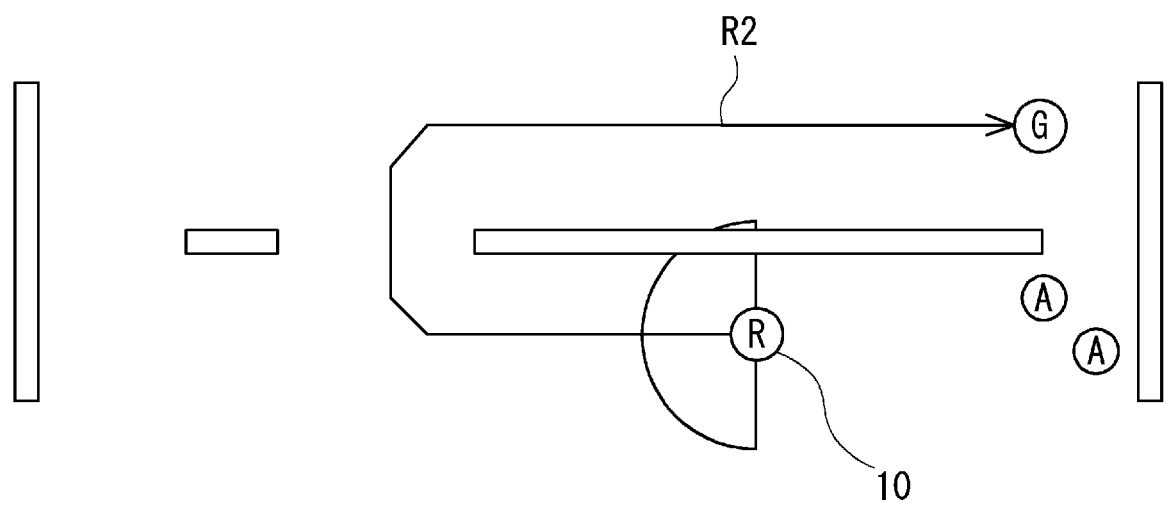
FIG. 14 is a diagram showing that a robot moves along a moving path that has been re-set.

As shown in FIG. 13, the storage unit 3 stores the category A of the person classified by the obstacle classification unit 5 in association with the position data of this person. As shown in FIG. 14, the robot 10 moves in accordance with the moving path R2 re-set by the path setting unit 2.

Figure 15:
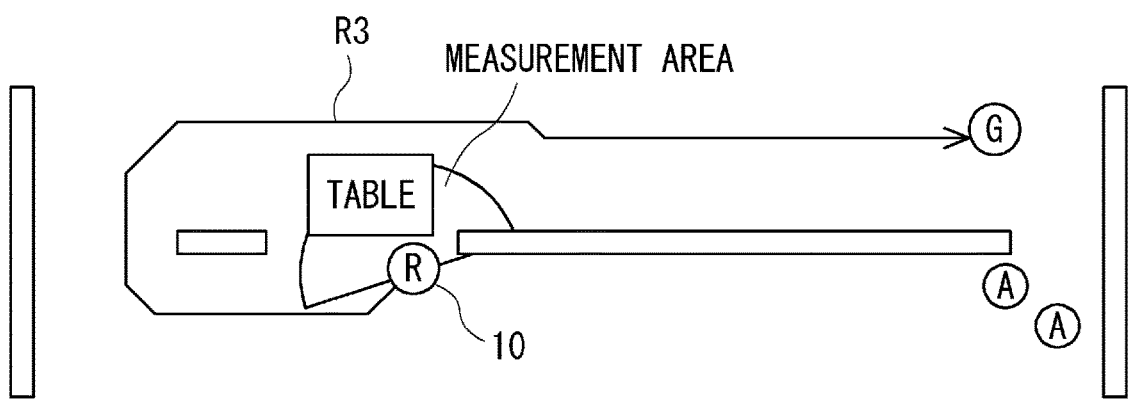
FIG. 15 is a diagram showing that a table has fallen within a measurement area of a sensor unit and a moving path has been re-set.

As shown in FIG. 15, a table located in the central passage falls within the measurement area of the sensor unit 13 of the robot 10. The path setting unit 2 re-sets a shortest moving path R3 to the target position G based on the position data of the table acquired by the sensor unit 13, and the environmental map and the position data of the obstacle stored in the storage unit 3.

Figure 16:
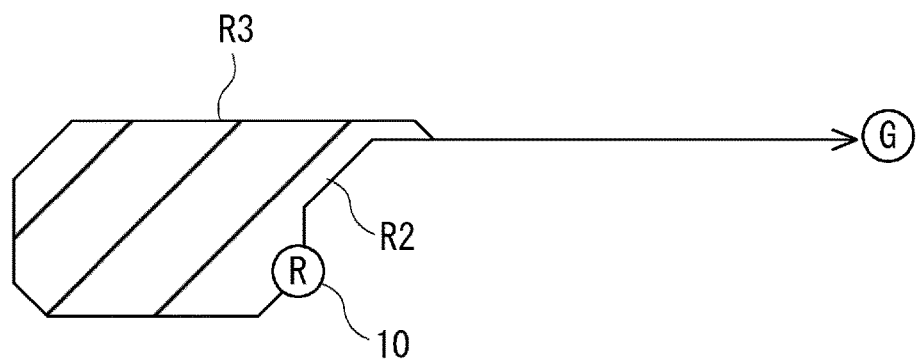
FIG. 16 is a diagram showing a region surrounded by moving paths.
Figure 17:
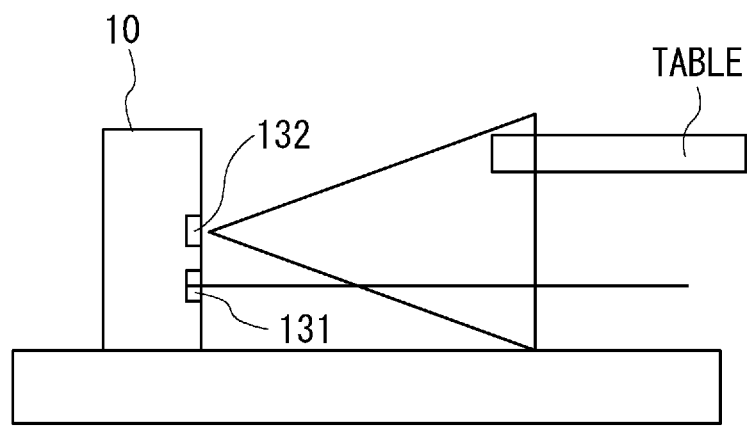
FIG. 17 is a diagram showing that only a depth sensor has detected the table.

As shown in FIG. 16, the path setting unit 2 determines that the area S (shaded part) of the region surrounded by the moving paths R2 and R3 is equal to or larger than the threshold, and determines that the moving path R3 is an alternative path. As shown in FIG. 17, the obstacle classification unit 5 determines, based on the point group data from the sensor unit 13, that only the depth sensor 132 detects the table, and classifies this table into the category B.

Figure 18:
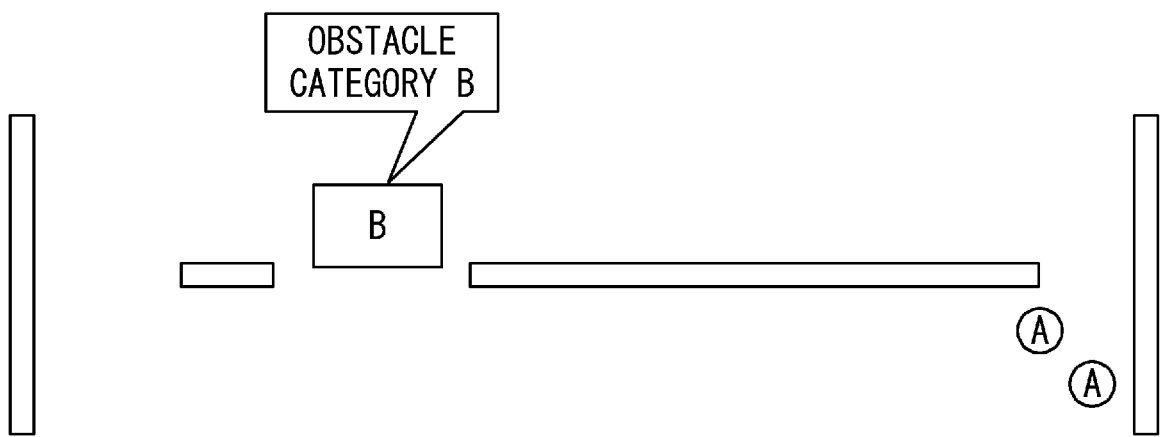
FIG. 18 is a diagram showing that a category of the table that has been classified and position data of the table are stored in association with each other.
Figure 19:
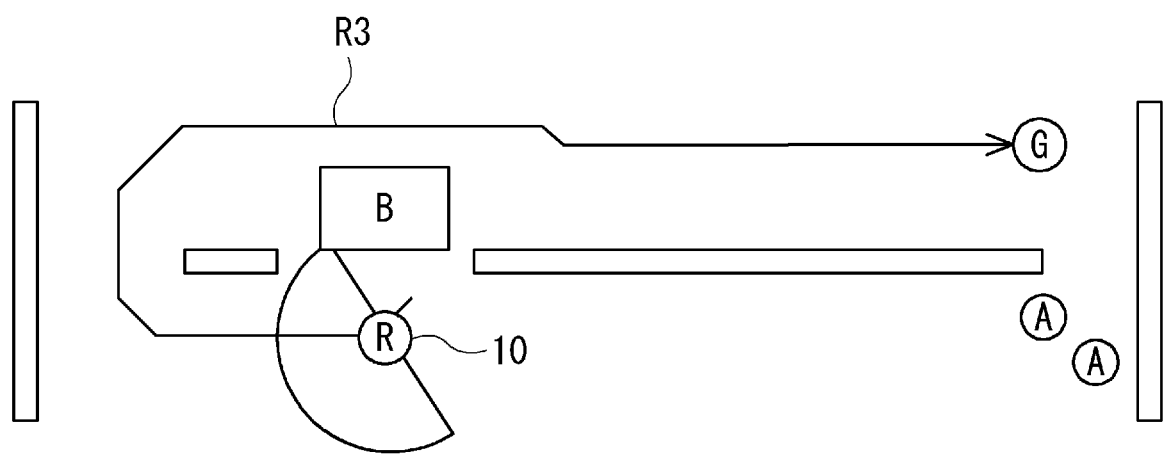
FIG. 19 is a diagram showing that the robot moves along a moving path that has been re-set.

As shown in FIG. 18, the storage unit 3 stores the category B of the table classified by the obstacle classification unit 5 in association with the position data of this table. As shown in FIG. 19, the robot 10 moves along the moving path R3 re-set by the path setting unit 2.

Figure 20:
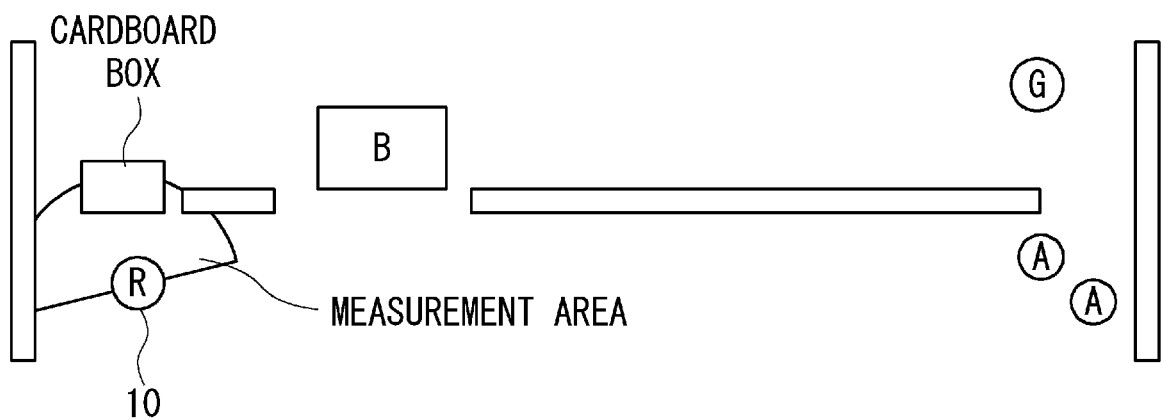
FIG. 20 is a diagram showing that a cardboard box has fallen within a measurement area of a sensor unit.
Figure 21:
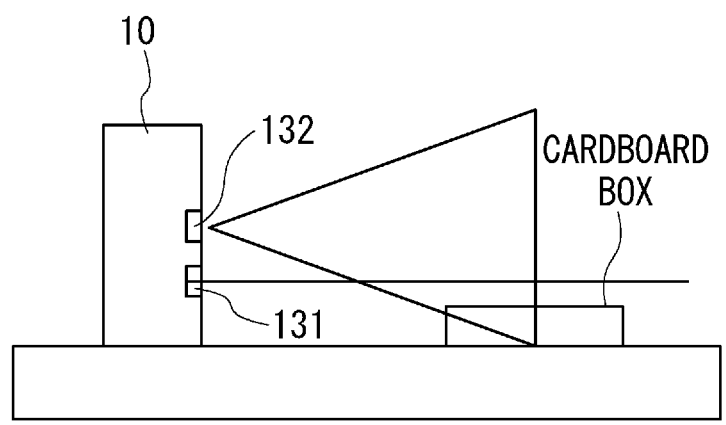
FIG. 21 is a diagram showing that only a laser range finder has detected the cardboard box.

As shown in FIG. 20, a cardboard box located in the left-side passage falls within the measurement area of the sensor unit 13 of the robot 10. As shown in FIG. 21, the obstacle classification unit 5 determines, based on the point group data from the sensor unit 13, that only the laser range finder 131 has detected this cardboard box, and classifies this cardboard box into the category C.

Figure 22:
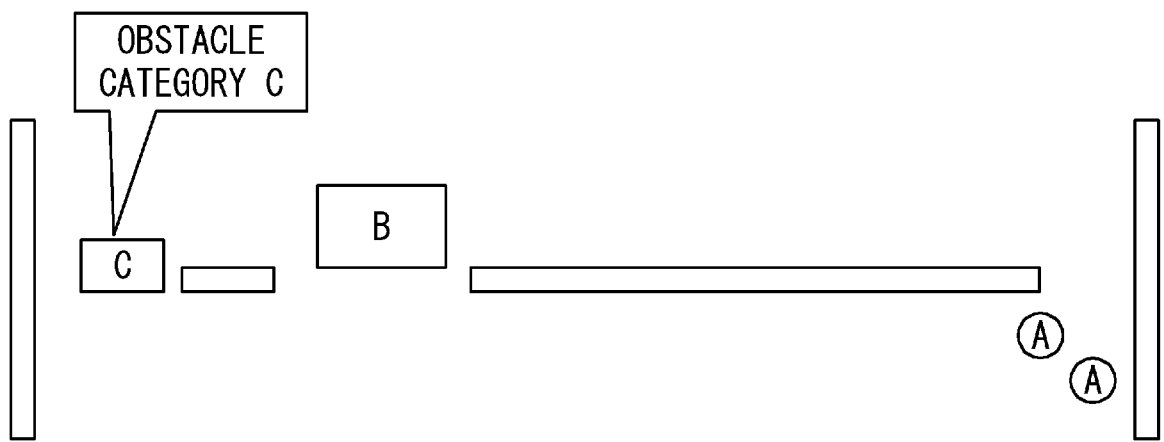
FIG. 22 is a diagram showing that a category of the cardboard box that has been classified and position data of this cardboard box are stored in association with each other.

As shown in FIG. 22, the storage unit 3 stores the category C of the cardboard box classified by the obstacle classification unit 5 in association with the position data of this cardboard box. The path setting unit 2 tries to re-set the shortest moving path to the target position G based on the position data of the cardboard box acquired by the sensor unit 13, and the environmental map and the position data of the obstacles (the person and the table) stored in the storage unit 3. In this case, however, the path setting unit 2 determines that it is impossible to re-set the moving path due to the presence of the obstacles (the cardboard box, the table, and the person).

The path setting unit 2 erases, based on the erasure conditions of the storage unit 3, the position data of the obstacle in the storage unit 3, and re-sets the moving path. Conditions such as, for example, as described above, trying to re-set the moving path while erasing the obstacles in the category A one by one and then trying to re-set the moving path while erasing the obstacles in the category D one by one are set as the erasure conditions.

Figure 23:
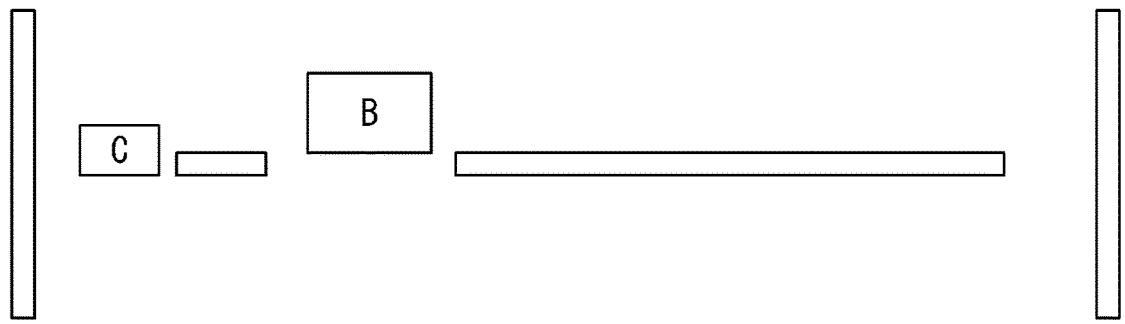
FIG. 23 is a diagram showing that position data of a person in a category A has been erased.
Figure 24:
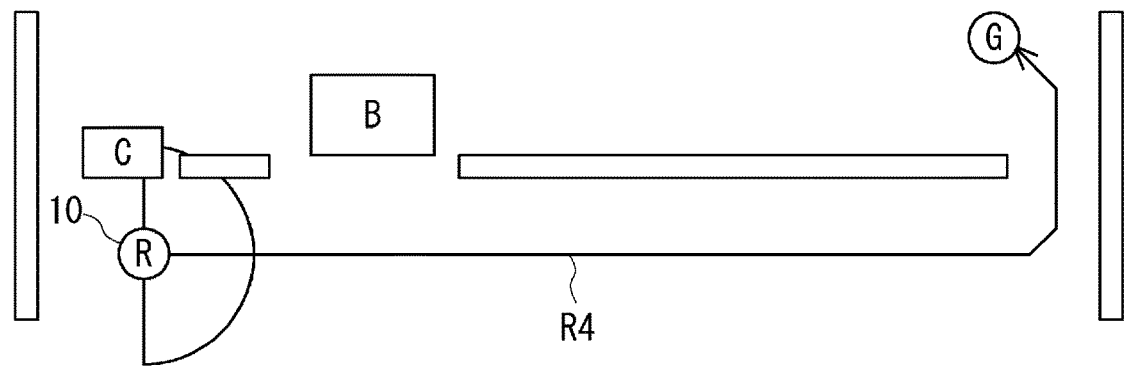
FIG. 24 is a diagram showing that the robot moves along a moving path that has been re-set.

As shown in FIG. 23, the path setting unit 2 erases the position data of the person in the category A in the storage unit 3 in accordance with the aforementioned erasure conditions. As shown in FIG. 24, the path setting unit 2 re-sets a shortest moving path R4 to the target position G based on the position data of the obstacles acquired by the sensor unit 13, and the environmental map and the position data of the obstacles (the table and the cardboard box) stored in the storage unit 3.

Figure 25:
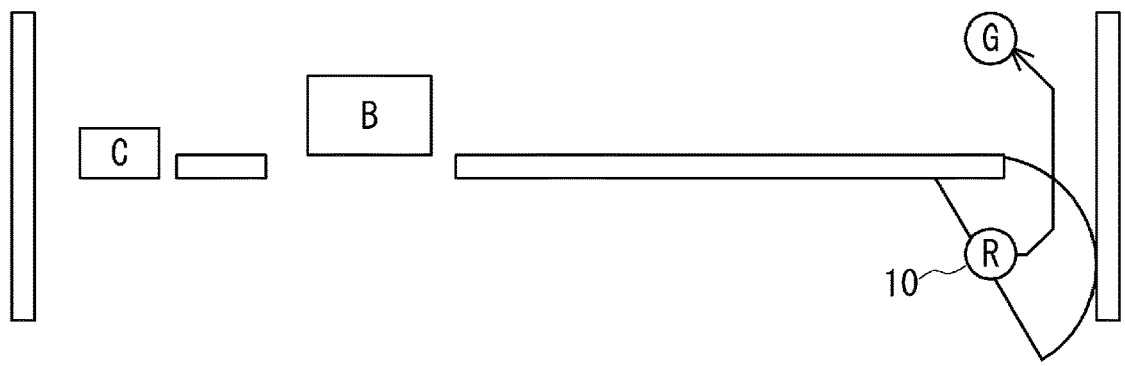
FIG. 25 is a diagram showing that the robot passes a right-side passage and reaches the target position.

As shown in FIG. 25, the robot 10 is able to move along the moving path R4 re-set by the path setting unit 2, pass the right-side passage where there is no person, and reach the target position G. In the third embodiment, the components the same as those in the aforementioned first and second embodiments are denoted by the same reference symbols and detailed descriptions thereof are omitted.

While some embodiments of this disclosure have been described above, these embodiments are presented as examples and are not intended to limit the scope of the disclosure. These novel embodiments can be implemented in other various forms, and various types of omissions, substitutions, or changes can be made without departing from the spirit of the disclosure. These embodiments and their modifications, as would fall within the scope and spirit of the disclosure, are included in the disclosure provided in the claims and the scope of equivalents thereof.

While the sensor unit 13 is configured to include the laser range finder 131 and the depth sensor 132 in the aforementioned embodiments, it is not limited thereto and may be configured to include an arbitrary distance sensor as long as it can classify the types of the obstacles. The sensor unit 13 may be configured, for example, to include the laser range finder 131 and a camera, or may be configured to include a plurality of depth sensors with different performance. The obstacle classification unit 5 classifies an obstacle into one of a plurality of categories based on the data from the sensor unit 13.

While the path setting unit 2, the storage unit 3, the path determination unit 4, and the obstacle classification unit 5 in the aforementioned embodiments are configured to be provided in the robot 10, it is not limited thereto. At least one of the path setting unit 2, the storage unit 3, the path determination unit 4, and the obstacle classification unit 5 may be provided in the robot 10 and the others may be provided in an external device or the like other than the robot 10. By providing at least one of the path setting unit 2, the storage unit 3, the path determination unit 4, and the obstacle classification unit 5 in the outside of the robot 10, the size and the weight of the robot 10 can be reduced.

Figure 26:
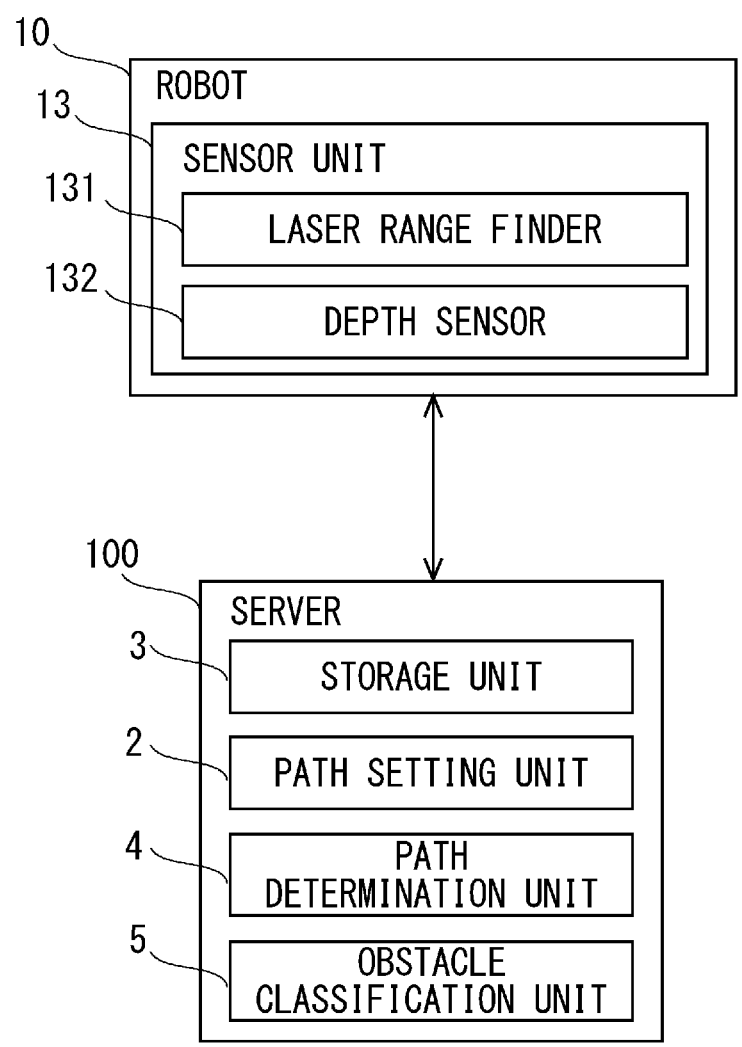
FIG. 26 is a diagram showing a configuration in which a path setting unit, a storage unit, and a path determination unit are provided in a server.

As shown in FIG. 26, for example, the path setting unit 2, the storage unit 3, the path determination unit 4, and the obstacle classification unit 5 may be provided in the server 100 and only the sensor unit 13 may be provided in the robot 10. The server communicates with the robot 10 wirelessly such as Wifi (registered trademark) and Bluetooth (registered trademark) or by a wire. The sensor unit 13 of the robot transmits the position data of the obstacle that has been acquired to the server wirelessly, for example.

The present disclosure may achieve the processing shown in FIGS. 5 and 8 by, for example, causing a CPU to execute a computer program.

The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.).

Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A path planning device comprising:
   a sensor configured to detect position data of an obstacle in a vicinity of a moving body;
   a memory configured to store the detected position data of the obstacle on a moving path of the moving body; and
   a processor configured to:
      set the moving path to a target position of the moving body based on (i) an environmental map of the moving body, (ii) the detected position data of the obstacle, and (iii) the stored position data of the obstacle,
      regularly update the set moving path,
      in response to determining that the detected obstacle is positioned on a first moving path to the target position of the moving body after the first moving path is set, set a second moving path in which no obstacle is located on the moving path to the target position, and
      store, in the memory, the position data of the detected obstacle on the first moving path when a second movement load required for the moving body to move along the second moving path, which is based on at least one of a distance of travel of the moving body along the second moving path or an area surrounded by the second moving path, is larger than a first movement load required for the moving body to move along the first moving path, which is based on at least one of a distance of travel of the moving body along the first moving path or an area surrounded by the first moving path, and not store the position data of the detected obstacle on the first moving path when the second movement load for the movement along the second moving path is less than the first movement load for the movement along the first moving path.

2. The path planning device according to claim 1, wherein:
   the processor is configured to classify the detected obstacle into one of a plurality of predetermined types, and
   when the load in accordance with the movement along the second moving path is larger than the load in accordance with the movement along the first moving path, the memory stores the position data of the detected obstacle on the first moving path based on the type of the classified obstacle.

3. The path planning device according to claim 2, wherein:
   the processor classifies the detected obstacle as a dynamic obstacle that moves or a static obstacle that does not move, and
   the memory stores position data of the classified static obstacle classified and does not store position data of the classified dynamic obstacle.

4. The path planning device according to claim 2, wherein:
   the sensor includes a plurality of different sensors configured to acquire the position data of the obstacle in the vicinity of the moving body, and
   the processor determines whether each of the plurality of sensors is able to detect the obstacle, thereby classifying the detected obstacle into one of a plurality of predetermined types.

5. The path planning device according to claim 1, wherein the processor is configured to:
   classify the detected obstacle into one of a plurality of predetermined types, and
   in response to determining that the second moving path cannot be set based on the position data of the obstacle stored in the memory, erases the position data of the obstacle in the memory based on the type of the classified obstacle and sets the moving path.

6. The path planning device according to claim 5, wherein the processor is configured to:
   classify the detected obstacle as a dynamic obstacle that moves or a static obstacle that does not move, and a priority order of the dynamic obstacle when the position data of the obstacle is erased is set to be higher than a priority order of the static obstacle, and
   in response to determining that the second moving path cannot be set, erase the position data of the obstacles in the memory one by one in accordance with the priority order of the type of the classified obstacle and sets the moving path.

7. The path planning device according to claim 6, wherein the processor is configured to:
   classify the detected obstacle as the dynamic obstacle, the static obstacle, or an unknown obstacle, which is classified as neither the dynamic obstacle nor the static obstacles, and the priority order of the dynamic obstacle, the priority order of the unknown obstacle, and the priority order of the static obstacle are set to be high in this order, and
   in response to determining that the second moving path cannot be set, erase the position data of the obstacles one by one from the obstacle having a priority order that is the highest, thereby setting the moving path.

8. A path planning method comprising:
   detecting position data of an obstacle in a vicinity of a moving body;
   storing the detected position data of the obstacle on a moving path of the moving body;
   setting the moving path to a target position of the moving body based on (i) an environmental map of the moving body, (ii) the detected position data of the moving body, and (iii) the position data of the obstacle that has been stored, and regularly updating the moving path that has been set;
   in response to determining that the detected obstacle is positioned on a first moving path to the target position of the moving body after the first moving path is set, setting a second moving path in which no obstacle is located on the moving path to the target position; and
   storing the position data of the obstacle on the first moving path when a second movement load required for the moving body to move along the second moving path, which is based on at least one of a distance of travel of the moving body along the second moving path or an area surrounded by the second moving path, is larger than a first movement load required for the moving body to move along the first moving path, which is based on at least one of a distance of travel of the moving body along the first moving path or an area surrounded by the first moving path, and not storing the position data of the detected obstacle on the first moving path when the second movement load for the movement along the second moving path is less than the first movement load for the movement along the first moving path.

9. A non-transitory computer readable storage medium storing a program for causing a computer to execute processing of:
- detecting position data of an obstacle in a vicinity of a moving body;
- storing the detected position data of the obstacle on a moving path of the moving body;
- setting the moving path to a target position of the moving body based on (i) an environmental map of the moving body, (ii) the detected position data of the obstacle, and (iii) the position data of the obstacle that has been stored, and regularly updating the moving path that has been set;
- in response to determining that the detected obstacle is positioned on a first moving path to the target position of the moving body after the first moving path is set, setting a second moving path in which no obstacle is located on the moving path to the target position; and
- storing the position data of the detected obstacle on the first moving path when a second movement load required for the moving body to move along the second moving path, which is based on at least one of a distance of travel of the moving body along the second moving path or an area surrounded by the second moving path, is larger than a first movement load required for the moving body to move along the first moving path, which is based on at least one of a distance of travel of the moving body along the first moving path or an area surrounded by the first moving path, and not store the position data of the detected obstacle on the first moving path when the second movement load for the movement along the second moving path is less than the first movement load for the movement along the first moving path.

10. A path planning device comprising:
- a sensor configured to acquire position data of an obstacle in a vicinity of a moving body;
- a memory configured to store the acquired position data of the obstacle on a moving path of the moving body; and
- a processor configured to:
  - set the moving path to a target position of the moving body based on (i) an environmental map of the moving body, (ii) the position data of the obstacle acquired by the sensor, and (iii) the position data of the obstacle stored in the memory, and regularly update the set moving path;
  - in response to determining that the obstacle acquired by the sensor is positioned on a first moving path to the target position of the moving body after the first moving path is set, set a second moving path in which no obstacle on the moving path to the target position, and
  - store the position data of the obstacle on the first moving path acquired by the sensor when a second movement load required for the moving body to move along the second moving path, which is based on at least one of a distance of travel of the moving body along the second moving path or an area surrounded by the second moving path, is larger than a first movement load required for the moving body to move along the first moving path, which is based on at least one of a distance of travel of the moving body along the first moving path or an area surrounded by the first moving path, and not store the position data of the detected obstacle on the first moving path when the second movement load for the movement along the second moving path is less than the first movement load for the movement along the first moving path.

* * * * *